United States Patent [19]

Pomerantz

[11] 4,072,924
[45] Feb. 7, 1978

[54] AUTOMOTIVE PRIORITY MESSAGE DISPLAY

[75] Inventor: Allen J. Pomerantz, Bancroft, Mich.

[73] Assignee: General Motors Corporation, Detroit, Mich.

[21] Appl. No.: 576,617

[22] Filed: May 12, 1975

[51] Int. Cl.² ............................................. G08B 19/00
[52] U.S. Cl. ................................ 340/52 F; 307/10 R; 340/324 B; 340/414
[58] Field of Search ............. 340/27, 52 F, 21, 324 B, 340/337, 373, 378 R, 412, 414, 325; 180/103 R; 307/10 R; 325/304; 328/147, 148, 160

[56] References Cited

U.S. PATENT DOCUMENTS

| | | | |
|---|---|---|---|
| 2,504,965 | 4/1950 | Davis | 340/414 |
| 3,124,792 | 3/1964 | Thaler | 340/179 |
| 3,158,849 | 11/1964 | Thaler | 340/182 |
| 3,582,949 | 6/1971 | Forst | 340/410 |
| 3,798,596 | 3/1974 | Sumiyoshi et al. | 340/52 F |
| 3,879,704 | 4/1975 | Noji | 340/52 F |
| 3,988,730 | 10/1976 | Valker | 340/412 |

Primary Examiner—John W. Caldwell
Assistant Examiner—Joseph E. Nowicki
Attorney, Agent, or Firm—Warren D. Hill

[57] ABSTRACT

A system displays messages one at a time to inform a vehicle operator of malfunctions or other events occurring in a vehicle with priority being given to the event of most importance whenever more than one event is sensed concurrently. A display device then selects messages for display and code switches are actuated to provide a unique electrical code signal for each message to indicate to the system which message is selected at a given moment. A number of sensors in the vehicle each respond to an event and an electrical sensor signal of unique value is provided for actuation of each sensor switch. A circuit compares the code signal with the sensor signal to drive the display device to select another message when the two signals are not in harmony and to display the selected message when the two signals are in harmony. A provision is made to render a sensor switch ineffective to affect the sensor signal when a sensor switch of higher priority is concurrently actuated.

3 Claims, 5 Drawing Figures

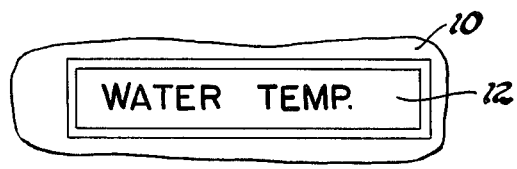
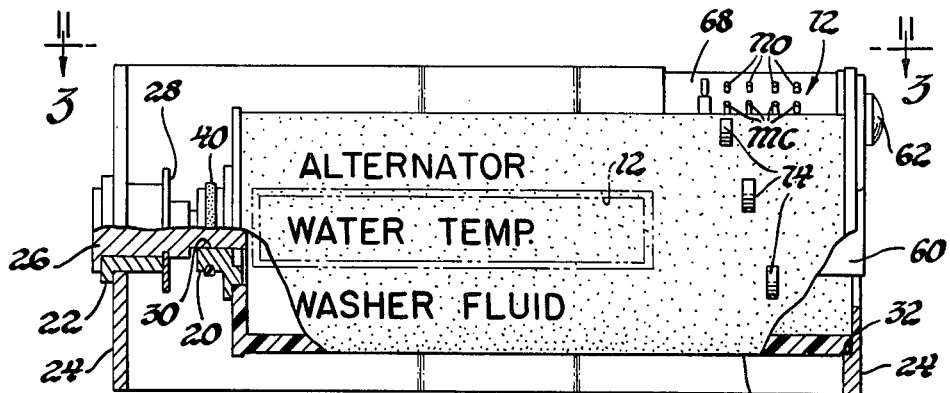
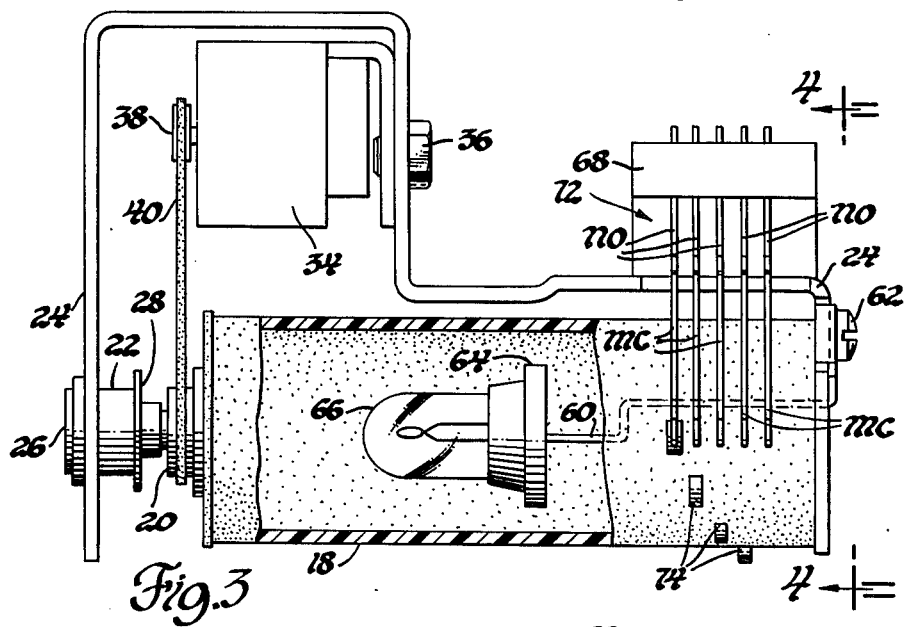
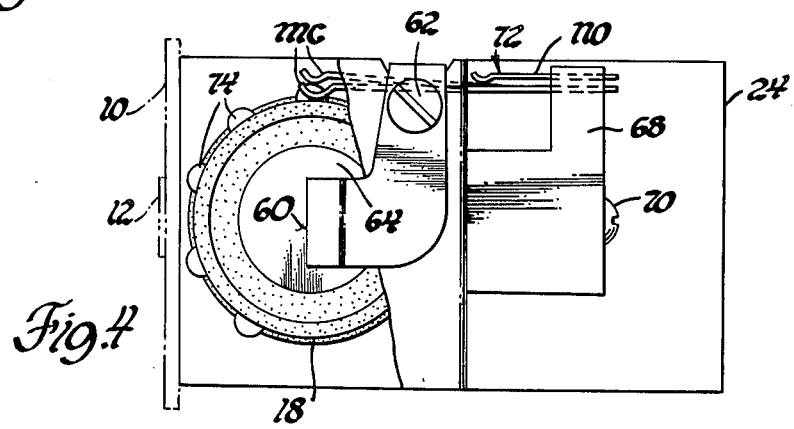

AUTOMOTIVE PRIORITY MESSAGE DISPLAY

This invention relates to message display devices for a motor vehicle and particularly to such a device which singly displays messages according to the priority determined by the importance of events occurring within the vehicle.

It is the practice in motor vehicles to provide visual messages displayed on the instrument panel to alert the vehicle operators to malfunctions or other events occurring within the vehicle. It has been proposed to display such messages one at a time from a single display window using a message device which selectively displays any one of many messages. Since some of the events monitored in a vehicle are of a critical nature and others are of relatively minor importance, it is desirable to display messages on the basis of priority determined by the relative importance assigned to the events.

It is therefore an object of this invention to provide in a motor vehicle a multiple message display system for singly displaying the messages according to a priority arrangement based on the importance or significance of sensed events.

It is a further object to provide such a system which displays a message corresponding to any sensed event which occurs alone and displays only the event of highest priority when two or more events occur concurrently.

The invention is carried out by providing a display device for selecting messages for display and for singly displaying messages, a circuit controlled by the display device to produce an electrical code signal having a distinct value for each selected message, a number of event responsive sensors each assigned a priority in accordance with the significance of its respective event, a circuit including the sensors to produce an electrical event signal having a distinct value for each sensor and being arranged so that in the case of concurrent events, only the sensor of highest priority will determine the value of the event signal, and a circuit for comparing the code and event signals to display the selected message when it corresponds to the sensed event of highest priority and to control the display to select another message when the selected message does not correspond to the sensed event of highest priority.

The above and other advantages will be made more apparent from the following specification taken in conjunction with the accompanying drawings wherein like reference numerals refer to like parts and wherein;

FIG. 1 is an illustration of a display area of a vehicle dash for providing an indication of a specific event;

FIG. 2 is a partly broken away front view of a rotary display device;

FIG. 3 is a partly broken away view of the rotary display taken along line 3—3 of FIG. 2;

FIG. 4 is a drawing of the rotary display device as viewed along the line 4—4 of FIG. 3.

Figure 5:
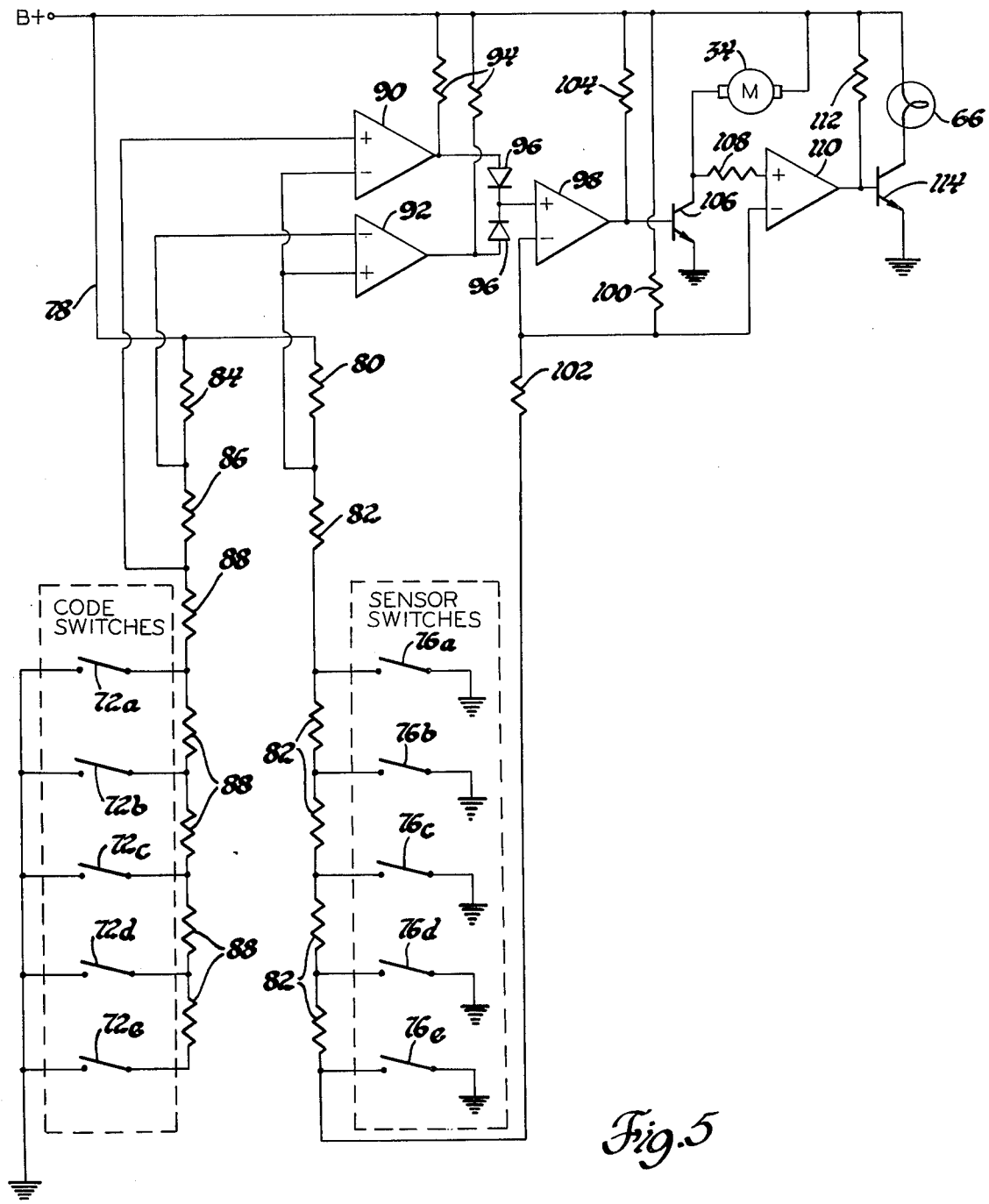
FIG. 5 is a schematic drawing of a circuit for controlling the display device according to the invention.

Referring to FIG. 1, a viewing station on the vehicle dash 10 includes a viewing window 12 in a position on the dash 10 so as to be readily observable by the vehicle operator.

Referring to FIGS. 2 through 4, the vehicle display system of this invention includes a translucent and insulating drum 18 having a plurality of messages such as ALTERNATOR, WATER TEMPERATURE, WASHER FLUID, OIL PRESSURE, etc., spaced therearound. The messages on the drum 18 represent events which may occur at remote locations in the vehicle, the occurrences of which are to be indicated to the vehicle operator. The events which may occur are assigned priority on the basis of the significance or criticality of the event. For example, loss of oil pressure is more significant and therefore has a higher priority than washer fluid level, since it requires immediate action by the vehicle operator.

A pulley 20 is secured in a concentric relationship to one end of the drum 18. A sleeve 22 extends through and is secured to a bracket 24. A pin 26 extends through the sleeve 22 and the pulley 20 and is laterally secured by a holding ring 28 in a groove in the pin 26. The interface between the pulley 20 and the pin 26 forms a bearing surface 30 which rotatably supports one end of the drum 18. The other end of the drum 28 extends into a circular recess in the bracket 24 with the interface therebetween forming a second bearing surface 32 which rotatably supports the drum 18. The drum 18 is rotated by a rotary motor 34 which is secured to the bracket 24 by a fastener 36. A pulley 38 driven by the motor 34 in turn drives pulley 20 by a belt 40.

The bracket 24 with the attached drum 18 and drive motor 34 is mounted in any conventional manner within the vehicle behind the dash 10 and adjacent the viewing window 12 so that the messages on the drum 18 are observable by the vehicle operator through the viewing window 12. When the motor 34 is energized, the drum 18 is rotated so that messages on the drum are sequentially exposed at the window 12.

A lamp holder 60 is secured to the bracket 24 by a screw 62 and extends into the drum 18 through an opening in the bracket 24. A lamp socket 64 is attached to the lamp holder 60 and carries a display lamp 66 which, when energized, illuminates the message on the drum 18 which is positioned adjacent the viewing window 12. A terminal block 68 is secured to the bracket 24 by a screw 70 and carries a plurality of code switches 72, the number of switches 72 being equal to the number of messages spaced around the drum 18. Each of the switches 72 is associated with a respective one of the messages on the drum 18 and includes a normally open contact NO and a movable contact MC. The movable contact MC of each of the switches 72 extends from the terminal block 68 and engages the surface of the drum 18. As illustrated in the preferred embodiment, five switches 72 corresponding to five messages spaced around the drum 18 are provided. More or fewer switches may be used as required.

A plurality of cams 74, one for each switch are carried on the surface of the drum 18 at unique angular positions. The relative positions of the cams 74 and the movable contacts MC of the switches 72 are such that when the drum 18 is rotated, the movable contact MC of each of the switches 72 is moved into engagement with the normally open contact NO thereof when the message (herein called the selected message) with which said switch 72 is associated is positioned adjacent the viewing window 12. For example, as illustrated in FIGS. 2, 4 and 5, the switch 72 which is positioned furthest inward from the end of the drum 18 is associated with water temperature and the movable contact MC thereof is moved into engagement with the normally open contact NO thereof when the message WATER TEMPERATURE is positioned behind the viewing window 12, as shown, thereby providing an indication that the WATER TEMPERATURE message is selected.

A plurality of sensors remotely disposed in the vehicle each respond to an event to close a switch upon the occurrence of a respective event. As shown in FIG. 5, the sensor switches 76a through 76e are arranged in a circuit according to the order of priority of the respective events with 76a having higher priority than switch 76e. A voltage source B+ from a power supply, not shown, is connected through line 78 to a voltage dropping resistor 80 which in turn is connected to an array of serially connected resistors 82. Each junction point of the resistors 82 is connected through one of the sensor switches to ground with the last resistor 82 in the array being connected through switch 76e to ground. The line 78 is further connected through a voltage dropping resistor 84 and a voltage dropping resistor 86 of relatively small value and a serial array of resistors 88. The code switches 72 are here separately identified as switches 72a through 72e and are each connected from the junction pints of the resistors 88 to ground. The message corresponding to the code switch 72a corresponds to the event signalled by the sensor switch 76a and the other switch pairs denoted by the suffixes b, c, d and e likewise denote corresponding signals and messages.

A comparator circuit for controlling the display device in response to the actuation of switches 72 and 76 includes a first comparator 90 having its positive input terminal connected to the lower end of resistor 86 and its negative input terminal connected to the lower end of the resistor 80. A second comparator 92 has its positive terminal connected to the lower end of the resistor 80 and its negative terminal connected to the upper end of resistor 86. The output of the comparators 90 and 92 are connected to B+ through resistors 94 and further are connected through diodes 96 to the positive input terminal of a third comparator 98. A pair of resistors 100 and 102 are connected between B+ and the lower end of the resistor array 82 and have their junction connected to the negative input terminal of the comparator 98. The output of the comparator 98 is connected to B+ through a resistor 104 and is further connected to the base of a transistor 106 having a grounded emitter and its collector connected through the motor 34 to B+. The collector is further connected through a resistor 108 to the positive input terminal of a fourth comparator 110, the negative input of which is connected to the junction point of resistors 100, 102. The output of the comparator 110 is connected to B+ through a resistor 112 and to the base of a transistor 114 having its emitter grounded and its collector connected to the lamp 66.

In operation, an electrical sensor signal is present at the lower end of the voltage dropping resistor 80, the value of the signal being dependent on the condition of the switches 76. For example, if the switch 76a is closed, the potential of the signal is relatively low, and if only switch 76d is closed, the signal will be somewhat higher. The value of the signal therefore increases as the priority of the closed switch 76 decreases provided that only one switch 76 is closed at a time. If, however, switch 76b is closed and a switch of lower priority, say switch 76e is concurrently closed, it obvious that the switch 76e will have no effect on the potential of the signal since the higher priority switch 76b establishes a ground potential at its respective junction point in the array of resistors 82. Similarly, another potential is generated at the upper end of the resistor 86 and a potential of slightly different value is generated at the lower end of resistor 86. Since the resistor 86 is very small, the potentials appearing at each end of the resistor are very close together and these two potentials taken together are considered as a single code signal which is compared to the sensor signal. The specific value of the code signal varies stepwise according to which of the switches 72 is closed, such that the code signal is substantially equal to the sensor signal when the closed code switch corresponds to the highest priority closed sensor switch.

The comparison circuit continually monitors the relative values of the sensor and code signals to determine if the selected message indicated by the closed code switch corresponds to the highest priority sensed event and if ther is agreement, lights the lamp 66 to display the selected message and if there is disagreement, operates the motor 34 to rotate the drum 18 and thereby sequentially select code messages until agreement occurs, and thereupon stop the motor and display the proper selected message by turning on lamp 66. The code signal applied to the comparators 90 and 9 defines a small band corresponding to the voltage drop across resistor 86. If the sensor signal is within that band, both comparators 90 and 92 will have a low output so that comparator 98 will also have a low output and the transistor 106 will be turned off. If one of the sensor switches 76 is closed, the negative input of comparator 110 will have a lower potential then that applied at the positive input so that the comparator 110 will have a high output to turn on the transistor 114 and light the lamp 66 to display the selected message. If no sensor switch 76 is closed, the negative input of comparator 110 will be hgh so that transistor 114 and lamp 66 will be turned off. In addition, when no sensor switch is closed, the negative input of the comparator 98 is high so that the comparator output is low irrespective of the condition of comparators 90 and 92 so that the transistor 106 and motor 34 cannot be turned on. When, however, a sender switch is closed and the corresponding code switch is not closed, the code signal will be different from the sensor signal and one of the comparators 90 or 92 will have a high output and in turn cause the comparator 98 to have a high output to operate the motor 34. The motor 34 will operate until the display device selects the appropriate message and signifies this by closing the corresponding code switch whereupon the output of both comparators 90 and 92 will be low and the motor will stop and the lamp 66 will be illuminated to display the message.

It will thus be seen that the message display system described herein is effective to display a message to a vehicle operator corresponding to any sensed event when the event occurs alone and display a message corresponding to the highest priority event when a plurality of events occur concurrently.

The embodiments of the invention in which an exclusive property or privilege is claimed are defined as follows:

1. A system for singly indicating the occurrence of any of a plurality of events in a motor vehicle and for indicating only the event of most significance when more than one event occurs concurrently, comprising
    a display device for selecting messages for display and for singly displaying messages corresponding to the events, code means controlled by the display device for producing a first electrical signal having a different voltage magnitude for each selected message, a plurality of sensors each comprising a switch actuated in response to an event, means for producing a second electrical signal in response to sensor actuation, the voltage magnitude of the second signal for each sensor being distinctive and having a predetermined correspondence to the magnitude of the first electrical signal for the message appropriate to the sensed event, the magnitudes of the second electrical signal being arranged in order of priority of the significance of the events, and including means for preferentially producing the signal magnitude of highest priority when a plurality of sensors are actuated concurrently, and voltage level comparator means comparing the first and second electrical signals to determine correspondence between the selected message and the sensed event of highest priority and for controlling the display device to select and display the message corresponding to the sensed event of highest priority.

2. A system for singly indicating the ocurrence of any of a plurality of events in a motor vehicle and for indicating only the event of most significance when more than one event occurs concurrently, comprising a display device for selecting messages for display and for singly displaying messages corresponding to the events, code means controlled by the display device for producing a first electrical signal having a different value for each selected message, a plurality of normally open sensor switches each closed in response to an event and each having a different priority according to the significance of the event, an array of resistors connected in series at junction points and having one end of the array connected through a voltage dropping resistor to a power supply, the sensor switches being connected in order of priority between the junction points and ground with the highest priority sensor switch connected to the junction point nearest the said one of the array, so that closure of a sensor switch develops a second electrical signal having a unique value corresponding to the value of the first electrical signal for the message denoting the sensed event and whereby the concurrent closure of other switches of lower priority has no effect on the value of the second electrical signal, and means comparing the first and second electrical signals to determine correspondence between the selected message and the sensed event of highest priority and for controlling the display device to select and display the message corresponding to the sensed event of highest priority.

3. A system for singly indicating the occurrence of any of a plurality of events in a motor vehicle and for indicating only the event of most significance when more than one event occurs concurrently, comprising a display device operated by a motor for sequentially selecting messages for display and means including a display lamp for singly displaying messages corresponding to the events, code means controlled by the display device for producing a first electrical signal having a different voltage for each selected message, a plurality of normally open sensor switches each closed in response to an event and each having a different priority according to the significance of the event, an array of resistors connected in series at junction points and having one end of the array connected through a voltage dropping resistor to a power supply, the sensor switches being connected in order of priority between the junction points and ground with the highest priority sensor switch connected to the junction point nearest the said one end of the array, so that closure of a sensor switch develops a second electrical signal having a unique voltage substantially equal to the voltage of the first electrical signal for the message denoting the sensed event and whereby the concurrent closure of other switches of lower priority have no effect on the voltage of the second electrical signal, and a comparison circuit for comparing the voltages of the first and second electrical signals for operating the motor to sequentially select messages when the two voltages are substantially different, and for stopping the motor when the two voltages are substantially equal, thereby indicating that the selected message corresponds to the highest priority closed sensor switch, and a circuit activated when a sensor switch is closed and the motor is stopped for illuminating the display lamp to display the selected message.

* * * * *

UNITED STATES PATENT AND TRADEMARK OFFICE
CERTIFICATE OF CORRECTION

PATENT NO. : 4,072,924
DATED : February 7, 1978
INVENTOR(S) : Allen J. Pomerantz It is certified that error appears in the above-identified patent and that said Letters Patent are hereby corrected as shown below:

Column 2, line 17 "drum 28" should read -- drum 18 --.

Column 4, line 17 "ther" should read -- there --; line 24 "90 and 9" should read -- 90 and 92 --; line 35 "hgh" should read -- high --.

Column 5, claim 2, line 45 after "one" insert -- end --.

Signed and Sealed this

Thirtieth Day of May 1978

[SEAL]

Attest:

RUTH C. MASON
Attesting Officer

LUTRELLE F. PARKER
Acting Commissioner of Patents and Trademarks